(12) United States Patent
Martin

(10) Patent No.: US 6,591,725 B1
(45) Date of Patent: Jul. 15, 2003

(54) CIRCULAR SAWING MACHINE

(75) Inventor: Max Martin, Ottobeuren (DE)

(73) Assignee: Otto Martin Maschinenbau GmbH & Co., Ottobeuren (DE)

( * ) Notice: Subject to any disclaimer, the term of this patent is extended or adjusted under 35 U.S.C. 154(b) by 46 days.

(21) Appl. No.: 09/651,090

(22) Filed: Aug. 30, 2000

(30) Foreign Application Priority Data

Aug. 30, 1999 (DE) .......................................... 199 41 138

(51) Int. Cl.[7] .......................... B23D 45/06; B23D 61/10
(52) U.S. Cl. ........................ 83/471.3; 83/473; 83/477.2; 83/481; 83/698.41
(58) Field of Search ................................ 83/473, 477.2, 83/471.3, 477, 481, 665, 666, 676, 698.41

(56) References Cited

U.S. PATENT DOCUMENTS

| | | | | |
|---|---|---|---|---|
| 362,338 A | * | 5/1887 | Walker ........................ 83/471.3 |
| 951,619 A | * | 3/1910 | Rawson ........................ 83/666 |
| 1,104,982 A | * | 7/1914 | Gage ........................ 83/471.3 |
| 3,970,125 A | * | 7/1976 | Muirhead et al. .......... 144/34.1 |
| 4,120,224 A | * | 10/1978 | Van Steenberg et al. ..... 83/666 |
| 4,326,361 A | * | 4/1982 | McGill ........................ 83/666 |
| 4,516,612 A | * | 5/1985 | Wiley ........................ 83/477.2 |
| 4,862,781 A | * | 9/1989 | Lauffer ....................... 83/477.2 |
| 4,934,238 A | * | 6/1990 | Lauffer ........................ 83/666 |
| 5,107,737 A | * | 4/1992 | Tagliaferri .................... 83/676 |
| 5,720,213 A | * | 2/1998 | Sberveglieri ................. 83/473 |
| 5,819,625 A | * | 10/1998 | Sberveglieri ................. 83/473 |
| 5,996,462 A | * | 12/1999 | Gittel et al. ............. 83/698.41 |

FOREIGN PATENT DOCUMENTS

| | | |
|---|---|---|
| DE | 4214760 C1 | 7/1993 |
| DE | 4331246 A1 | 3/1995 |
| DE | 19532726 A1 | 4/1996 |

* cited by examiner

Primary Examiner—Allan N. Shoap
Assistant Examiner—Stephen Choi
(74) Attorney, Agent, or Firm—Jacobson Holman PLLC

(57) ABSTRACT

A circular saw and in particular a circular saw bench, including a supporting surface for a workpiece and a saw blade which is able to project from a groove in the supporting surface. The saw blade is pivoted to both sides at a longitudinal edge of this groove.

23 Claims, 6 Drawing Sheets

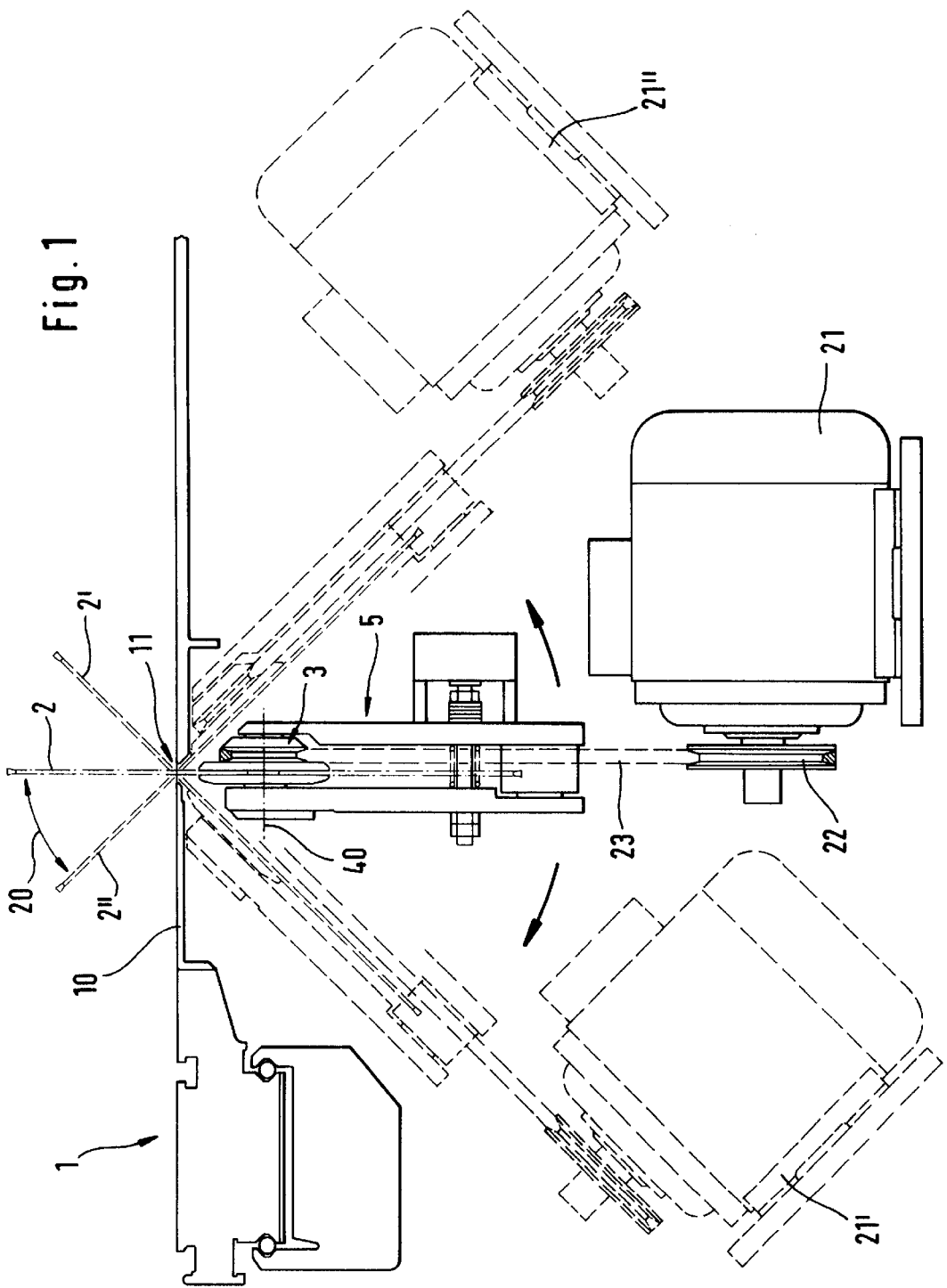

CIRCULAR SAWING MACHINE

BACKGROUND OF THE INVENTION

The invention relates to a circular sawing machine, comprising a supporting surface for the workpiece and a saw blade which projects from the supporting surface in the region of an opening, the saw blade being held and driven by a drive flange and the saw blade being mounted to pivot in the circular sawing machine.

Circular sawing machines of the above kind have long been known in the woodworking field, such as in carpenter's shops, joiners' shops and woodworking shops. They are used to carry out a wide variety of operations on workpieces made of wood or plastics material. One intended purpose is, for example, to trim workpieces in sheet form with such machines. At the same time it is also possible to use such machines to cut grooves or recesses of the same kind in the workpieces, which may be mouldings or panels for example.

The saw blade is held on a drive flange and the drive flange is situated, for example, on a mounting. Also provided on the drive flange are means for driving the saw blade, which means may be of considerable length in the axial direction. Provision may, for example, also be made for a drive motor to be positioned on the drive shaft driving the saw blade.

For making angled cuts it is known for the saw blade to be pivoted to one side about an axis which generally lies in the plane of the supporting surface. It is then possible for inclined grooves or mitres, for example, to be cut. Because of the large size of the drive on the flange there is only a limited capacity for pivoting. If, for example, it is desired to make a cut in an opposed, inclined direction, then there are machines known in the joinery field for example in which the complete mounting is designed to be rotatable about a substantially vertical axis and the whole arrangement including the saw blade is turned through 180° about this axis to make a cut in the direction mentioned. It is clear that it is very complicated and expensive to produce adjustability of this kind.

Otherwise the only option which the woodworker has is to feed the workpiece in some other way and under certain circumstances this may not be possible. The range of uses to which such known machines can be put is therefore limited.

It is an object of the present invention to provide an improved circular sawing machine of the above kind, in which their adjustability and convenience to the user would be greatly increased.

BRIEF SUMMARY OF THE INVENTION

The present invention provides circular sawing machine, comprising a supporting surface for the workpiece and a saw blade which projects from the supporting surface in the region of an opening, the saw blade being held and driven by a drive flange and the saw blade being mounted to pivot in the circular sawing machine, characterised in that provision is made for the saw blade to be pivotable to both sides in the region of the opening relative to a plane at right angles to the supporting surface.

A design of this kind provides an immense advantage in circular sawing machines according to the invention. The possibility of enabling various operations to be performed simply by pivoting the saw blade makes the work very much easier. At the same time it is possible for the pivotable mounting of the circular saw blade, which is known in principle, to be retained in the same form and simply to have added to it the appropriate means for obtaining a larger range of pivot, thus making the cost and complication of obtaining a machine of this kind considerably less than was needed in the prior art for a circular saw arrangement rotatable about a vertical axis.

In a preferred embodiment of the invention, provision is made for a mounting to be provided for the drive flange and for the mounting to be made narrow and slender in the direction of pivot below the supporting surface. In the prior art, particularly in the region of the drive spindle and on at least one side relative to the saw blade, a relatively wide arrangement has been produced to mount and drive the saw blade. Because of this arrangement of large size on one side it was impossible to achieve pivotability in both directions, given that the structure, being wide on one side, collided with the underside of the supporting surface if pivoted in this direction. The proposal according to the invention in the first place provides a slender mounting which is narrow in the direction of pivot, but whose strength is not reduced for this reason. The important thing in this case is that, in the region below the supporting surface the mounting, or rather the layout of the drive flange, is produced in such a way as to save as much space as possible, in order to provide sufficient range of pivot for a desired angle of pivot in both directions.

For this design, it is also possible for the members which hold the drive flange to be arranged on essentially one side of the mounting. It is for example conceivable in this case for the drive flange to be mounted in such a way as to be substantially overhanging.

In an alternative embodiment, the drive flange is provided on a mounting and the mounting extends on both sides of the saw blade, substantially symmetrically to the saw blade, in the area below the supporting surface. Optimum use is made of the space available by a design of this kind. In accordance with the invention, it is proposed that substantially symmetrical pivotability be obtained, i.e. pivotability in both directions relative to the opening from which the saw blade projects. In the final analysis it is the mounting of the saw blade on the drive flange which restricts the maximum range of pivot. To obtain as large as possible a range of pivot in both directions, an advantageous provision which is made in this case is for the means for supporting the saw blade on the mounting also to be symmetrically positioned in order to make optimum use of the space available.

Provision is further made for the drive flange to comprise a drivable spindle flange and a mating flange which co-operates with the spindle flange and is detachable therefrom. The design according to the invention in this case is selected to be such for example that the mating flange may also be in the form of a securing nut which can be screwed onto the spindle flange. The mounting of the drive flange in this case is substantially overhung, i.e. a bearing is provided on each side of the saw blade. As an alternative to this, provision may be made for the mounting to comprise two holding parts which are hinged together and for the first holding part to carry the spindle flange and the second to carry the mating flange, with the two flanges being mounted to rotate. In the arrangement described here, the symmetrical division of the respective functions relative to the plane of the saw blade is maintained and the mounting is split into two elements. Advantageously, the saw blade is centrally arranged, to rotate between two bearings.

Because of the hinged connection between the two holding parts, it is also possible for a quick-change arrangement for the saw blade to be produced easily. In an alternative embodiment, the two holding parts can be connected together substantially permanently, or in other words to be bolted together, although it would then be more laborious to change a saw blade.

What is achieved by the design according to the invention is that an angle of pivot of ±60° is possible for the saw blade. This angle of pivot is possible in both directions, i.e. complex operations can be performed without any complicated re-orientation or re-positioning of the workpiece. What is preferably used is a range of angles of pivot of ±45°, which will allow even mitre cuts or the like to be made in workpieces without any lengthy setting-up times. The pivotability is relative in this case to the vertically orientated saw blade or to an imaginary plane extending at right angles to the supporting surface.

The above circular sawing machines preferably take the form of circular saw benches and are used in joiners' shops, carpenters' shops and woodworking shops. It is even possible for circular sawing machines of this kind to be employed as parts of woodworking systems or centres.

BRIEF DESCRIPTION OF THE SEVERAL VIEWS OF THE DRAWINGS

Other embodiments of the invention are described in the subclaims and are shown in the accompanying drawings, in which FIG. 1 is an elevation of a circular sawing machine according to the invention in three different positions.

DETAILED DESCRIPTION

Figure 2A:
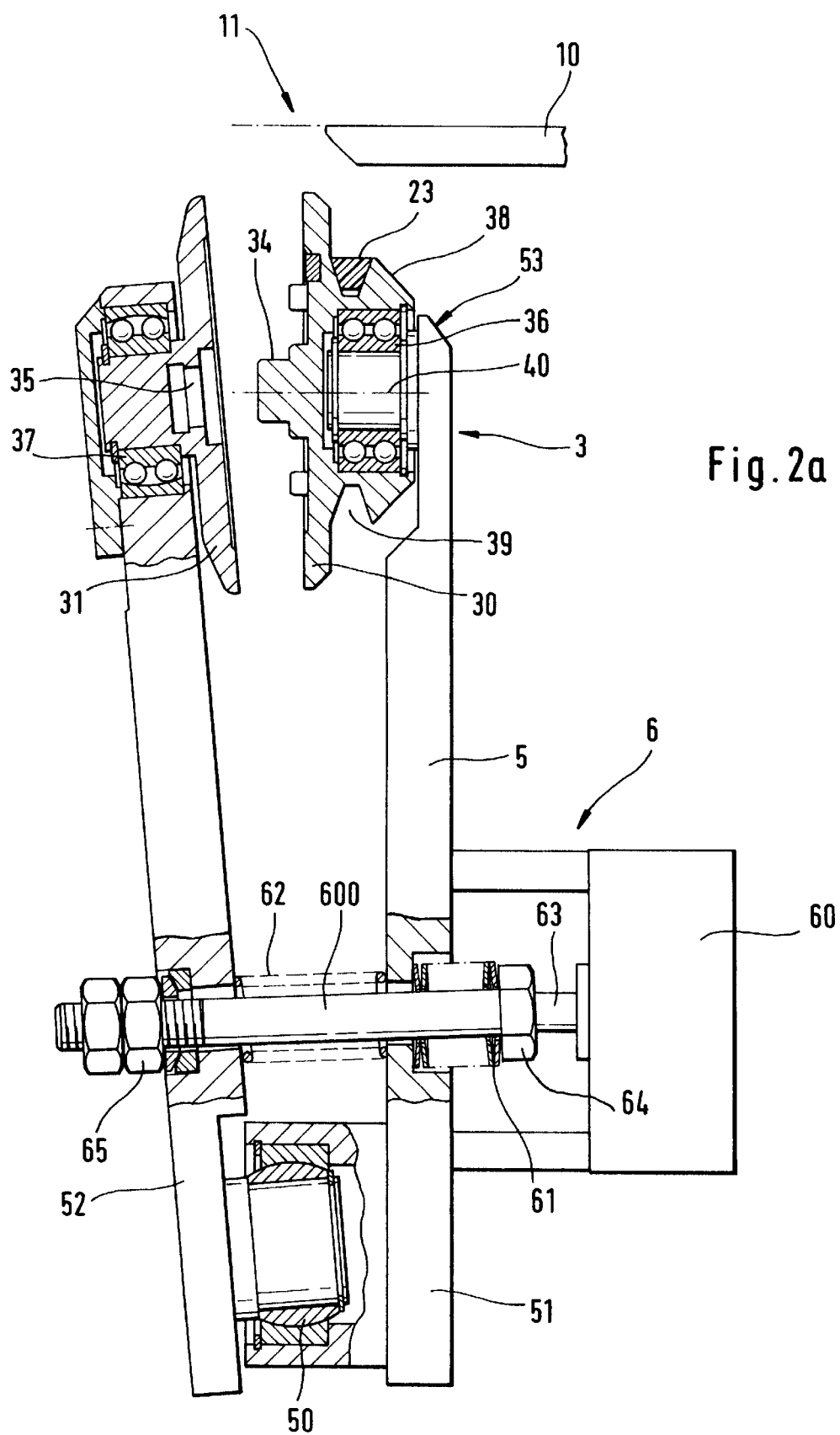
FIGS. 2a and 3a and 2b and 3b are pairs of elevations of a detail of the circular sawing machine according to the invention in two different positions (in the tool changing position in FIGS. 2a and 2b and in the working position in FIGS. 3a and 3b)

FIG. 1 shows a circular saw according to the invention. The circular saw is shown in elevation in this case, with the line of sight coinciding with the plane of the saw blade. The circular saw 1 has a saw blade 2 which, in the embodiment shown here, is shown in two different, pivoted positions 2' and 2". A pivoting movement 20 of about 45° is possible in both directions, to permit mitre cuts for example to be made. A greater range of pivot 20 is also possible and this may be up to ±60°.

The workpiece (not shown) rests on a supporting surface 10. Supporting surface 10 contains a slotted or groove-like opening 11 through which the saw blade 2 is able to project, the width of opening 11 being such that even when pivoted, saw blade 2 does not collide with the edge part of supporting surface 10 in the region of opening 11.

Saw blade 2 is secured to a drive flange 3 which is situated beneath supporting surface 10. Drive flange 3 in turn is held by a mounting 5 to which the drive motor 21 too can be secured in a known manner. Drive motor 21 drives a vee-belt 23 via a drive pulley 22 which vee-belt 23 transmits the torque to the rotatably mounted drive flange 3.

The whole arrangement, namely saw blade 2, drive flange 3, mounting 5 and motor 21, is mounted to pivot on the circular saw 1. The axis of pivot in this case may, for example, lie in the supporting surface 10 and may, for example, be situated at right angles to the axis of rotation 40 of the drive flange 3 i.e. the saw blade 2. The whole drive unit may be mounted to pivot on, for example, a guideway, with the means of achieving such pivotability being sufficiently well known from the prior art.

FIGS. 2 and 3 each show elevations of the drive flange 3 and various details thereof in two different positions. In FIG. 2 the quick-change arrangement 6 is in operation to allow drive flange 3 to be fitted with a new saw blade (not shown). In FIG. 3 the machine is ready to operate, i.e. saw blade 2 is fitted, drive flange 3 is holding saw blade 2 and quick-change arrangement 6 is out of action.

In the embodiment shown here, mounting 5 comprises two holding parts 51, 52. The two holding parts 51, 52 are connected by a spherical plain bearing 50. The quick-change arrangement 6 is provided to produce movement of holding parts 51, 52 relative to one another via spherical plain bearing 50.

Figure 4:
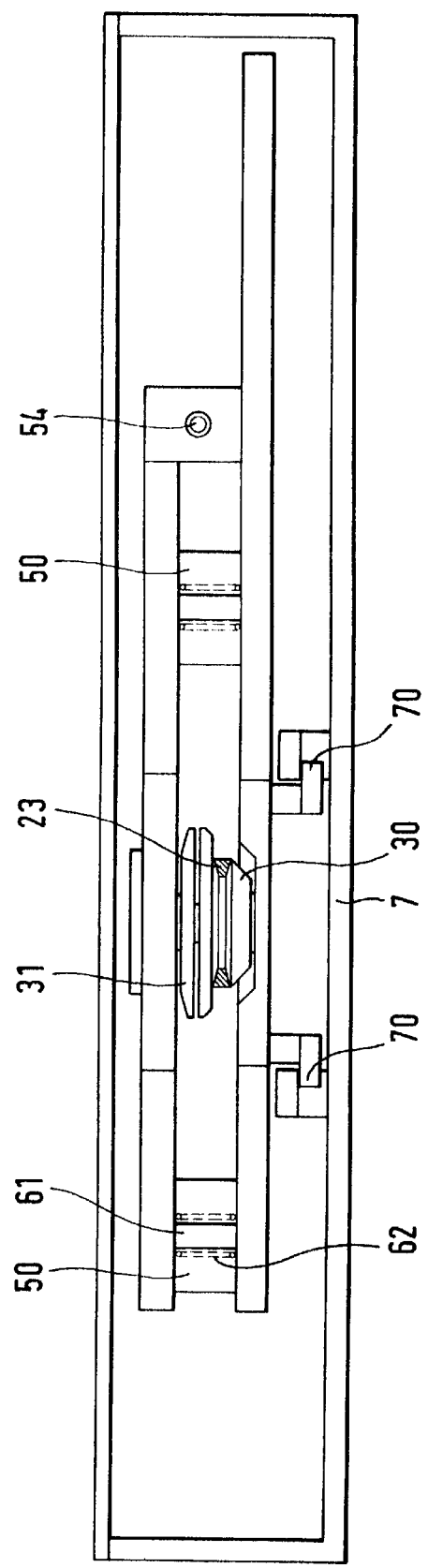
FIG. 4 is a plan view of a further detail of the circular saw according to the invention.

In FIG. 4 it can be seen that there are two spherical plain bearings 50 present. For vertical adjustability, a vertical guide means 7 is provided for mounting 5. Provided below supporting surface 10 is a vertical guideway 70 which allows the vertical position of the whole arrangement to be altered. Vertical guide means 7 is situated on a pivoting bracket and, when the pivoting movement 20 takes place, it too is pivoted, by which means on the one hand the imaginary axis of rotation of circular saw blade 2 remains unchanged and, on the other, the depth of groove to be cut in a pivoted position can be adjusted. Known vertical guideways 70, such as high-precision roller or rack and pinion slideways or the like, are provided to guide mounting 5 on vertical guide means 7. For automatic actuation, a spindle drive or a traction cable may be provided but it is also possible for a manual means of vertical adjustment, such as an appropriate spindle drive, to be provided.

In FIG. 2a, drive flange 3 is provided on mounting 5, which comprises the two holding parts 51, 52. An attempt has been made in this case to obtain a symmetrical layout for drive flange 3, and for mounting 5 too, in relation to saw blade 2, so that these items can be arranged with as much space as possible saved to give a large range of pivot 20. To save space, a bevel 53 is for example made on mounting 5 at its front end adjacent supporting surface 10. This bevel extends in a similar way onto rotatably mounted spindle flange 30, which also has a bevel 38 extending right round it in this area.

Spindle flange 30 is situated on the first mounting part 51, on which the actuating cylinder 60 of quick-change arrangement 6 is also mounted and held. Spindle flange 30 is positioned on the front end of first holding part 51 via a ball bearing 36. It is indicated that in the upper region, the first holding part 51 has a slimmer or waisted-down section. Bearing 36 is provided in this stepped-down area. The waisted-down section also saves space in the very area which is crucial in this case and enlarges the range of pivot 20 which can be obtained accordingly.

Spindle flange 30 contains a groove 39 in which vee-belt 23 is seated and in which it transmits the torque to drive flange 3. On the inner side, the side facing saw blade 2, spindle flange 30 has a spigot 34 which projects into a corresponding recess 35 in mating flange 31. The purpose of this is to allow mating flange 31 to be clearly positioned relative to spindle flange 30.

As described, in this embodiment drive flange 3 comprises two elements, namely spindle flange 30 and mating flange 31. Mating flange 31 is situated on the second holding part 52, which is connected to first holding part 51 via spherical plain bearing 50. To correct for the axial misalignment caused by the pivoting movement about spherical plain bearing 50, the ball-bearing provided for mating flange 31 is not an ordinary ball-bearing but a self-aligning bearing 37 to provide the support on holding part 52.

In the design of drive shown here, drive flange 3 is driven by spindle flange 30 and vee-belt 23. There is a drive-transmitting pin 33 provided which, in the embodiment shown here, is positioned on spindle flange 30 and which co-operates with a corresponding hole in the saw blade and in the mating flange 31 situated opposite, to ensure that the torque applied by vee-belt 23 is transmitted to saw blade 2.

In a variant of the invention, provision is made for drive-transmitting pin 33 to be produced on drive flange 3 when, for example, the latter is formed integrally with or to co-operate with a securing nut.

It has been described how mounting 5 is substantially monolithic or, as shown in FIGS. 2, 3 comprises two elements, holding parts 51, 52, which correspond to one another. With a design of this kind it is also advantageously possible to produce a quick-change arrangement 6.

Figure 2B:
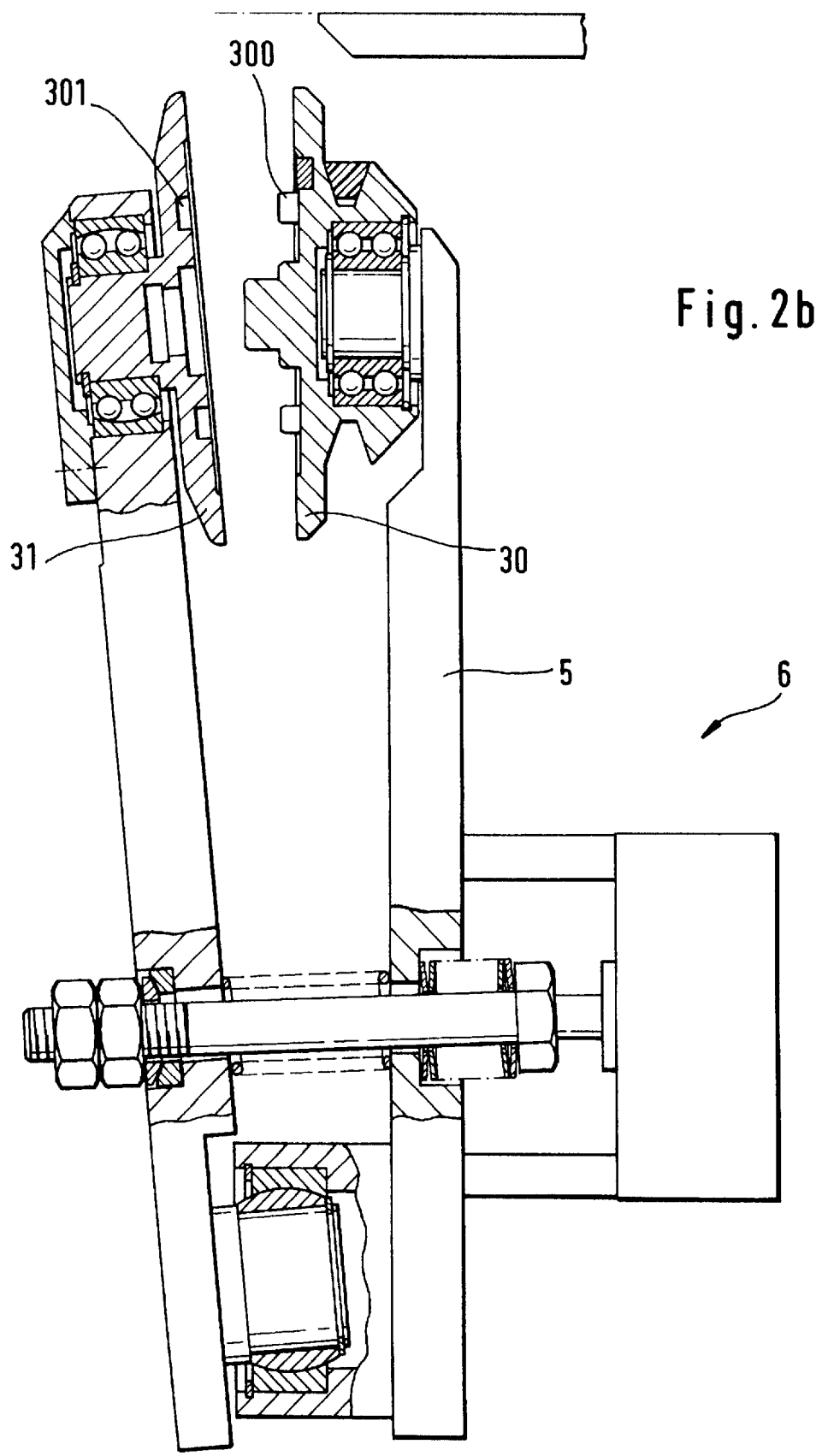

Provision is made for the two holding parts 51, 52 to be pressed together by the force exerted by a spring 61 in such a way that saw blade 2 is securely held between spindle flange 30 and mating flange 31. The force exerted by spring 61 in this case is of a size such that the two elements are pressed securely together. Spring 61 is positioned outside the first holding part 51 in this case and is supported, on the one hand, on the head 64 of a bolt 600 and, on the other, on first holding part 51. Bolt 600 passes through both the holding parts 51 and 52 and holes are provided for this purpose in the holding parts. At the end of bolt 600 facing the other holding part 52 are provided two nuts 65 (for locking against one another). Threaded onto bolt 600 in a position between the two holding parts 51, 52 is a further spring 62. The effect of compression spring 61 is, as shown in FIGS. 2a and 2b, to move the head 64 of bolt 600 towards the right in this case and thus also to displace nut 65 towards the right, as a result of which the second holding part 52 is pivoted towards the right in a clockwise direction as well. In the course of this, bolt 600 transmits the applied tensile force to the rear face of the second holding part 52 situated opposite.

Emerging from actuating cylinder 60 is a rod 63 which presses against bolt head 64. The support provided is hinging or, in other words, the bolt, which undergoes a tilting movement to match the tilted holding part, has hinging support against rod 63. The hinging is, for example, achieved by having holes of a suitable size in the holding parts. The direction in which rod 63 acts is opposite to the direction in which compression spring 61 acts, so that spring 61 is compressed when actuating cylinder 60 is activated (see FIGS. 2a, 2b) and, as a result, nut 65 is moved towards the left. By means of spring 62, which is threaded onto bolt 600 in the gap for example, the two holding parts are spread apart, in such a way that holding part 51 always bears against nut 65. Hence, although the actuating cylinder allows the holding parts to be opened, the actual opening movement is performed by compression spring 62. The hold for bolt 600 in holding part 52 in this case is of a size such that it is easily possible for holding part 52 to perform a tilting movement about spherical plain bearing 50.

Advantageously, a spring 62 is threaded onto bolt 600 in the gap between the two holding parts 51, 52 and this spring ensures that holding parts 51, 52 can be relied upon to move apart in the opened state, i.e., in particular, that second holding part 52 rests against retaining nut 65 and there is a sufficiently large gap between spindle flange 30 and mating flange 31 for a saw blade to be inserted. It is also possible for spring 62 not to be threaded onto bolt 600 but instead, if it were in the form of a leaf spring for example, for it to be guided and mounted in the gap in some other way.

Advantageously, the size of the opening 11 in the supporting surface 10 of the bench is such that even saw blades of very large diameters can be inserted into the open drive flange 3 from above. A design of this kind greatly simplifies the changing over of the machine.

Quick-change arrangement 6 is formed by actuating cylinder 60, the force from which is directed in the opposite direction to that from spring 61 and when required thrusts the two holding parts 51, 52 apart to release saw blade 2. To do this actuating cylinder 60 acts on piston rod 63. When the saw blade is going to be changed, the quick-change arrangement is activated in such a way that the cylinder moves piston rod 63 towards the left, spring assembly 61 is compressed by the head of bolt 600, the distance between the two holding parts 51, 52 increases and the compression spring 62 between the two holding parts spreads the two holding parts, which are hinged together via spherical plain bearing 50, apart so that the saw blade can be taken out.

The use of compression spring 61 causes an axial force to act on spindle flange 30 and mating flange 31. This axial force is carried by the two bearings 36, 37. By suitable sizing it is possible to set these forces in such a way that no damage will be done to the bearings as a result of excessively high axial forces. In operation however, it must be ensured that the two holding parts 51, 52 will not open at the wrong time and, due to the fast rotation and the high rotary impetus thereby generated, release the saw blade. To avoid excessively high holding forces, which could be applied by spring 61, it is also proposed in accordance with the invention that the two holding parts 51, 52 be securely connected and locked by a locking pin 54 in the state where they hold the saw blade 2. Pin 54 can be controlled in this case by electrical, pneumatic or hydraulic actuating means and, when the mounting needs to be closed securely, is guided in holding parts 51, 52 by respective bores which line up with one another in the closed state. This also makes a major contribution to the safety of the sawing machine. As an alternative it is possible for not two bores but only one to be positioned in one of the holding parts 51, 52 and for the actuating gear and mounting of locking pin 54 to be positioned on whichever is the other mounting part 51, 52, being fastened in position in a suitably mechanically strong fashion.

A further, highly convenient facility has been provided on the circular sawing machine in the form of the quick-change arrangement 6 for saw blade 2. Apart from the high degree of adjustability of the circular sawing machine designed in accordance with the invention, which allows pivotability in both directions, the quick-change arrangement, as described above, greatly reduces the setting-up time for changing the saw blade.

So that there is no risk of the inserted circular saw blade 2 dropping when the drive flange 3 is open (as shown in FIGS. 2a, 2b), a retaining magnet 32 is provided on drive flange 3. This allows saw blade 2 to be retained and aligned on spindle flange 30, in which case spigot 34 also passes through the saw blade, which has an opening or hole in the centre. At the same time, drive-transmitting pin 33 is positioned, for example, either on spindle flange 30 or on mating flange 31. It could even be designed to be magnetic itself in order to combine the two functions.

Provision is made for the actuating cylinder 60 for opening drive flange 3 not to be activated until the drive 21 of saw blade 2 has been switched off or has run down and until locking pin 54 separates, or rather releases, the two holding parts 51, 52. Actuating cylinder 60 is a hydraulic or pneumatic cylinder, for example, in this case. It will also be understood that the actuating cylinder may be an electrical actuator or motor which is capable of applying pressure to a piston rod 63 in opposition to the force exerted by spring 61. That the above steps occur in the correct sequence is monitored by the control of the machine.

Figure 3A:
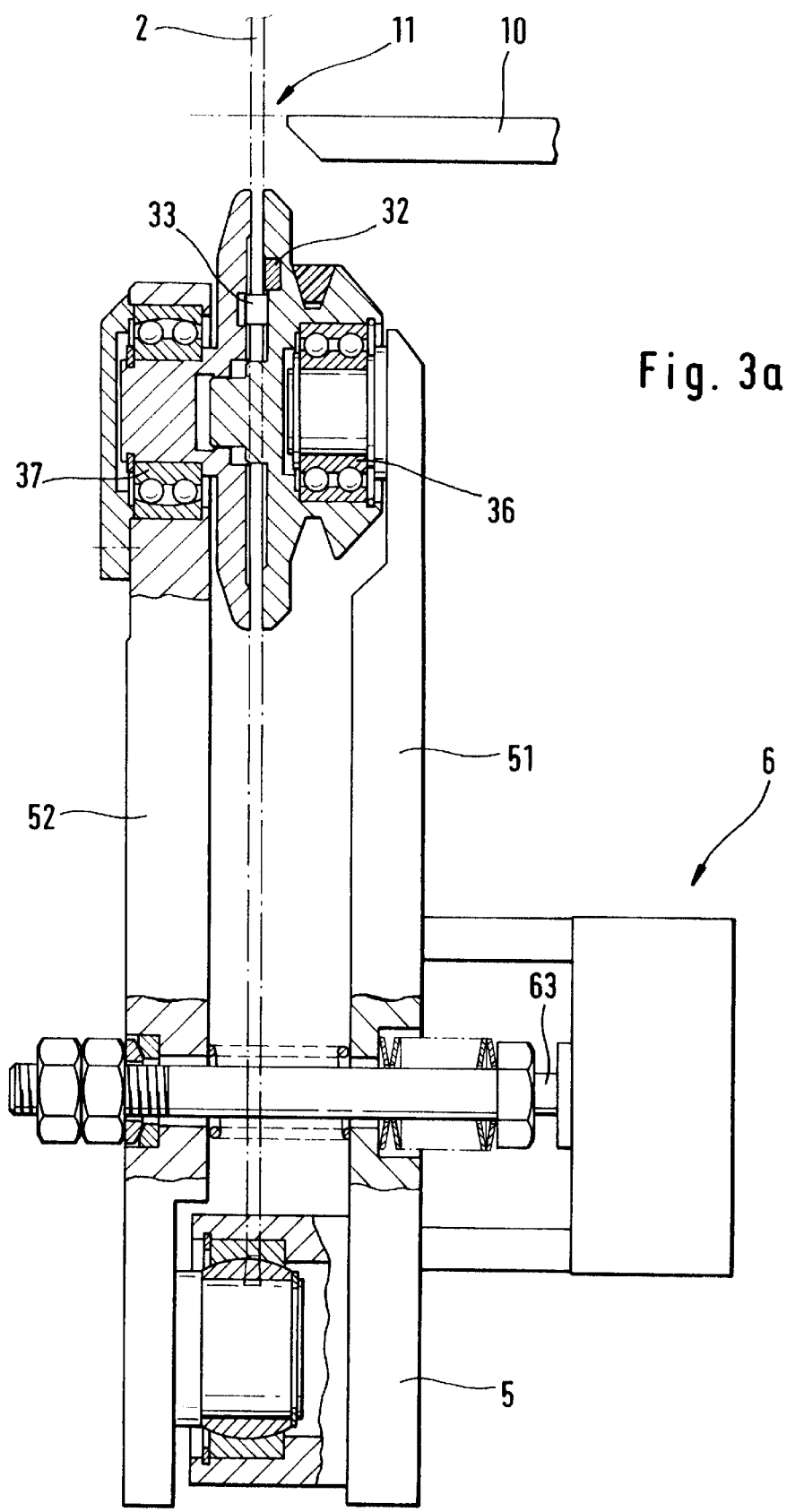
Figure 3B:
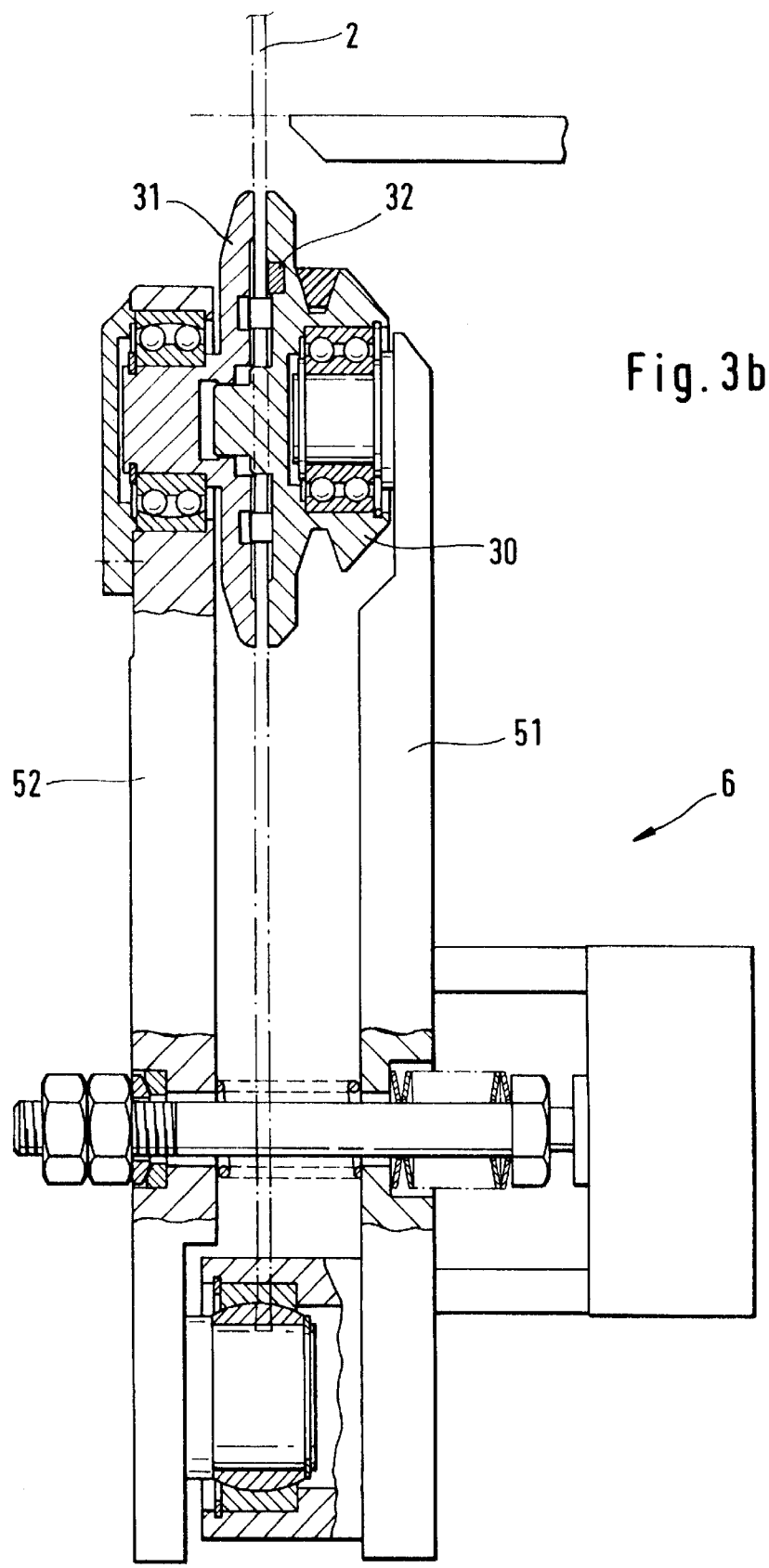

Shown in FIGS. 2b, 3b is a variant of alternative design to that shown in FIGS. 2a, 3a.

In FIG. 3a, there is a drive-transmitting pin 33 provided which engages in a corresponding bore in mating flange 31. This pin is responsible on the one hand for transmitting the torque reliably to mating flange 31 but in the same way it can equally well serve to transmit the torque reliably to saw blade 2 by an interlocking connection.

As an alternative, it is however also possible to have the torque transmitted to saw blade 2 only, or in addition, by a frictional connection between the saw blade and the spindle flange. This can for example be achieved by clamping the saw blade between the two flange members in a suitable way, spring 61 then needing to be sized accordingly. For saw blade 2 to be arranged in an exactly concentric position, it is then advantageous for one or more locating pins 300 to be provided on spindle flange 30, in the way they are for example arranged on drive flange 30 in FIG. 2, the position and spacing of these pins matching the inner hole in the saw blade and thus ensuring that the blade is concentrically mounted. As well as using a locating pin as indicated, it is also possible for a locating rim or a locating spring to be provided. With the drive flange in the closed state (as in FIG. 3b for example), the locating elements mentioned project into a corresponding annular groove (301). Where the locating means used are only one or more pins, they too can engage in recesses or cutouts. It is of course possible for the transmission of torque by an interlocking connection, i.e. the function performed by the drive-transmitting pin, also to be incorporated by means of the locating pins. To drive saw blade 2, provision is made either for a frictional connection and/or an interlocking connection, obtained, for example, by means of drive-transmitting pin 33.

In a variant of the invention, it is also possible for locating pin 300 to be positioned not on drive flange 30 but on mating flange 31, i.e. for exactly the reverse arrangement to be adopted, as shown in FIGS. 2b, 3b, without thereby reducing the effectiveness of the invention. The same also applies of course to the positioning of drive-transmitting pin 33, as shown in FIG. 3a, which can also be positioned on mating flange 31 in the same way and if necessary also engages in a hole in the drive flange.

The claims submitted with the application and any claims submitted at a later stage are attempted formulations without prejudice to the obtaining of wider protection.

The back-references given in the dependent claims indicate further refinements of the subject matter of the main claim achieved by means of the features described in the given subclaim. They should not however be looked upon as an abandonment of the possibility of obtaining substantive independent protection for the features of the dependent claims.

Features which at this stage are only disclosed in the specification may in the course of proceedings be claimed as of vital significance to the invention, to enable it to be distinguished from the prior art for example.

What is claimed is:

1. Circular sawing machine, comprising a supporting surface for the workpiece and a saw blade projecting from said supporting surface in a region of an opening of the supporting surface, said saw blade being held and driven by a drive flange and said saw blade being pivotally mounted for said saw blade to be pivotable to both sides in the region of said opening relative to a plane at right angles to said supporting surface, said drive flange including a drivable spindle flange and a mating flange co-operating with said spindle flange and being detachable therefrom, two holding parts hinged together for pivotal movement and a first holding part of said two holding parts carrying said spindle flange and a second holding part of said two holding parts carrying said mating flange, with said two flanges being rotatably mounted, said two holding parts being pivoted with respect to each other and pressed together by a force exerted by at least one spring in such a way that said saw blade is held between said spindle flange and said mating flange by the force exerted by said at least one spring.

2. Circular sawing machine according to claim 1, wherein a mounting is provided for said drive flange and said mounting is made narrow and slender in the direction of pivot below said supporting surface.

3. Circular sawing machine according to claim 1 wherein said drive flange is provided on a mounting and said mounting extends on both sides of said saw blade, substantially symmetrically to said saw blade, in the area below said supporting surface.

4. Circular sawing machine according to claim 1 wherein a self-aligning bearing is provided to support said mating flange on said second holding part which latter is hingably movable in relation to said first holding part.

5. Circular sawing machine according to claim 2 wherein a vertical guide means and a means of vertical adjustment are provided for said mounting.

6. Circular sawing machine according to claim 1 wherein a retaining magnet for said saw blade is provided on said drive flange.

7. Circular sawing machine according to claim 6 wherein said retaining magnet is provided on said spindle flange.

8. Circular sawing machine according to claim 1 wherein a drive-transmitting pin is provided on said drive flange.

9. Circular sawing machine according to claim 8 wherein said drive-transmitting pin is provided on said spindle flange or said mating flange.

10. Circular sawing machine according to claim 1 wherein one of at least one locating pin and a locating rim is provided on said drive flange.

11. Circular sawing machine according to claim 10 wherein said locating rim is also provided on said spindle flange.

12. Circular sawing machine according to claim 1 wherein said saw blade is connected, for transmission of rotation, to said spindle flange by at least one of a frictional connection and an interlocking connection.

13. Circular sawing machine according to claim 12 wherein said saw blade is connected to said spindle flange by the interlocking connection.

14. Circular sawing machine according to claim 1 wherein one of a recess, a hole and an annular groove is provided in said drive flange.

15. Circular sawing machine according to claim 14 wherein said one of the recess, the hole and the groove is provided in the mating flange.

16. Circular sawing machine according to claim 1 wherein a vee-belt drive is provided for said drive flange.

17. Circular sawing machine according to claim 16 wherein said vee-belt drive is provided for said spindle flange.

18. Circular sawing machine according to claim 1 wherein an angle of pivot of said saw blade is ±60° relative to the vertical.

19. Circular sawing machine according to claim 18 wherein said angle of pivot is ±45°.

20. Circular sawing machine according to claim 1 wherein, in the state in which they hold said saw blade, said two holding parts are connected together by a locking pin.

21. Circular sawing machine according to claim 1 wherein said circular sawing machine is in the form of a circular saw bench.

22. Circular sawing machine according to claim 1 wherein said circular sawing machine comprises a quick-change arrangement for said saw blade.

23. Circular sawing machine, comprising a supporting surface for the workpiece and a saw blade projecting from said supporting surface in a region of an opening of the supporting surface, said saw blade being held and driven by a drive flange and said saw blade being pivotally mounted for said saw blade to be pivotable to both sides in the region of said opening relative to a plane at right angles to said supporting surface, said drive flange including a drivable spindle flange and a mating flange co-operating with said spindle flange and being detachable therefrom, two holding parts hinged together for pivotal movement and a first holding part of said two holding parts carrying said spindle flange and second holding part of said two holding parts carrying said mating flange, with said two flanges being rotatably mounted, said two holding parts being pressed together by a force exerted by at least one spring in such a way that said saw blade is held between said spindle flange and said mating flange, and an actuating cylinder, a force from the actuating cylinder being directed in an opposite direction from the force of the at least one spring and when required thrusts said tow holding parts apart to release said saw blade.

\* \* \* \* \*